United States Patent

Utesch

[11] 4,226,364
[45] Oct. 7, 1980

[54] SINGLE CONDUIT AIR CONDITIONING SYSTEM

[76] Inventor: Alfred L. Utesch, P.O. Box 941, Argyle, Tex. 76226

[21] Appl. No.: 9,610

[22] Filed: Feb. 5, 1979

[51] Int. Cl.³ ............................................. F24D 3/02
[52] U.S. Cl. ...................................... 237/63; 237/13; 62/436; 165/18; 165/22
[58] Field of Search ............... 237/13, 44, 75; 62/436; 165/22, 97, 104 S, 4, 18

[56] References Cited

U.S. PATENT DOCUMENTS

| 787,748 | 4/1905 | Glantzberg | 237/13 |
| 3,384,155 | 5/1968 | Newton | 165/22 |

*Primary Examiner*—Albert J. Makay
*Assistant Examiner*—Henry Bennett
*Attorney, Agent, or Firm*—Wofford, Fails & Zobal

[57] ABSTRACT

An improved air conditioning system of the type wherein a conditioned fluid is conveyed from a central plant to a remote location where the fluid exchanges heat prior to being returned to the central plant for reconditioning. The system is provided with storage means for the fluid at the central plant and the remote location with a single conduit extending therebetween. Nonsimultaneously, pumps convey fluid through the single conduit from the central plant to the remote location and from the remote location to the central plant. In one embodiment, phase change may be employed to augment heat exchange capability at the remote location, or satellite.

9 Claims, 2 Drawing Figures 4,226,364

SINGLE CONDUIT AIR CONDITIONING SYSTEM

BACKGROUND OF THE INVENTION

1. Field of the Invention

This invention relates in general to air conditioning systems and more particularly to air conditioning systems wherein a fluid is used for transmitting energy for air conditioning from one location to another.

2. Description of the Prior Art

At the present time air conditioning of large areas is often accomplished by air conditioning systems in which a conditioned fluid is distributed for heat exchange. These systems usually comprise a large central conditioning plant coupled to remotely located heat exchangers by an expanse of supply and return pipes. An example of where this kind of system would be used is a complex of separate buildings requiring cooling. Cooling is provided by supplying cold water to heat exchangers located in each building; the water being chilled at a central plant and returned to the central plant after heat exchange. In winter, when heating is required, heated water or steam could be supplied from the central plant. An advantage of the central plant is efficiency. Since large air conditioners operate more efficiently per unit of heat transfer, a large central plant which supplies several buildings or areas can more efficiently cool or heat than separate smaller units. The central system also provides an advantage in operations and maintenance, further reducing the cost of the system when compared to individual units. However, these advantages have, in the past, been limited by the cost of piping systems. Due to these costs and the costs of pipe repairs and insulation, the advantages of a central plant are out weighed by the disadvantages when a load is located more than about one-half mile from the central plant. This disadvantage is decreased and the length of economical piping is increased with the increase in costs of energy when compared to pipe costs. However, this disadvantage remains a limiting factor in the distance over which a conditioned fluid can be economically transfered for air conditioning. Efforts have been made to reduce the the costs of piping and so increase the distance for economical fluid transfer. One such effort is shown in U.S. Pat. No. 3,989,267. In this patent is described a method of load prediction and fluid storage to reduce the size of the supply and return pipes and, therefore, reduce the cost of piping. This system also has the advantage of a more steady demand for production of conditioned fluid. However, since reducing the pipe diameter only slightly reduces the piping costs, this factor remains the limiting factor in the economical distance for air conditioning by piped fluid. Other patents which treat the problem of piping conditioned water to heat exchangers are U.S. Pat. Nos. 3,996,759, 3,318,371 and 2,715,514. None of these patents, however, significantly reduce piping costs.

SUMMARY OF THE INVENTION

It is accordingly the principal object of this invention to increase the economical distance over which conditioned fluid can economically be piped for air conditioning. It is also an object of this invention to provide a more efficient air conditioning system.

In accordance with these objects an air conditioning system of the type which utilizes a fluid for transferring energy from a first location to a second location, which fluid is returned to th first location to be prepared for again transferring energy to the second location, there is provided a single conduit which extends from the first location to the second location. Herein the term "energy" is used in the broad sense of being able to heat or cool air. Thus, in a strict sense, the cold fluid may represent negative heat energy with respect to ambient temperature. The conditioned fluid actually serves as a heat sink when it is cooling circulated air or a heat source when it is heating circulated air. Emabling the single conduit to efficiently carry the fluid both to and from the second location are three storage means. The first storage means is disposed at the second location and holds fluid in preparation for exchanging heat, loosely referred to as giving up energy at the second location. The second storage means is disposed at the second location and holds fluid which has already exchanged heat at the second location. The third storage means is disposed at the first location and holds fluid which has been returned from the second location but has not yet been prepared for heat transfer again. At the first location the single conduit is connected to the third storage means and the device which supplies fluid ready for heat transfer. At the second location the single conduit is connected to the first storage means and to the second storage means. A first pumping means pumps fluid from the device which supplies fluid ready for heat transfer, through the single conduit, to the first storage means. A second pumping means pumps fluid from the second storage means. Of course, the first pumping means and the second pumping means operate non-simultanelusly since fluid can pass only in one direction through the single conduit.

For a further understanding of the invention and further objects, features and advantages thereof, reference may now be had to the following description, taken in conjunction with the accompanying drawing.

DESCRIPTION OF PREFERRED EMBODIMENTS

Figure 1:
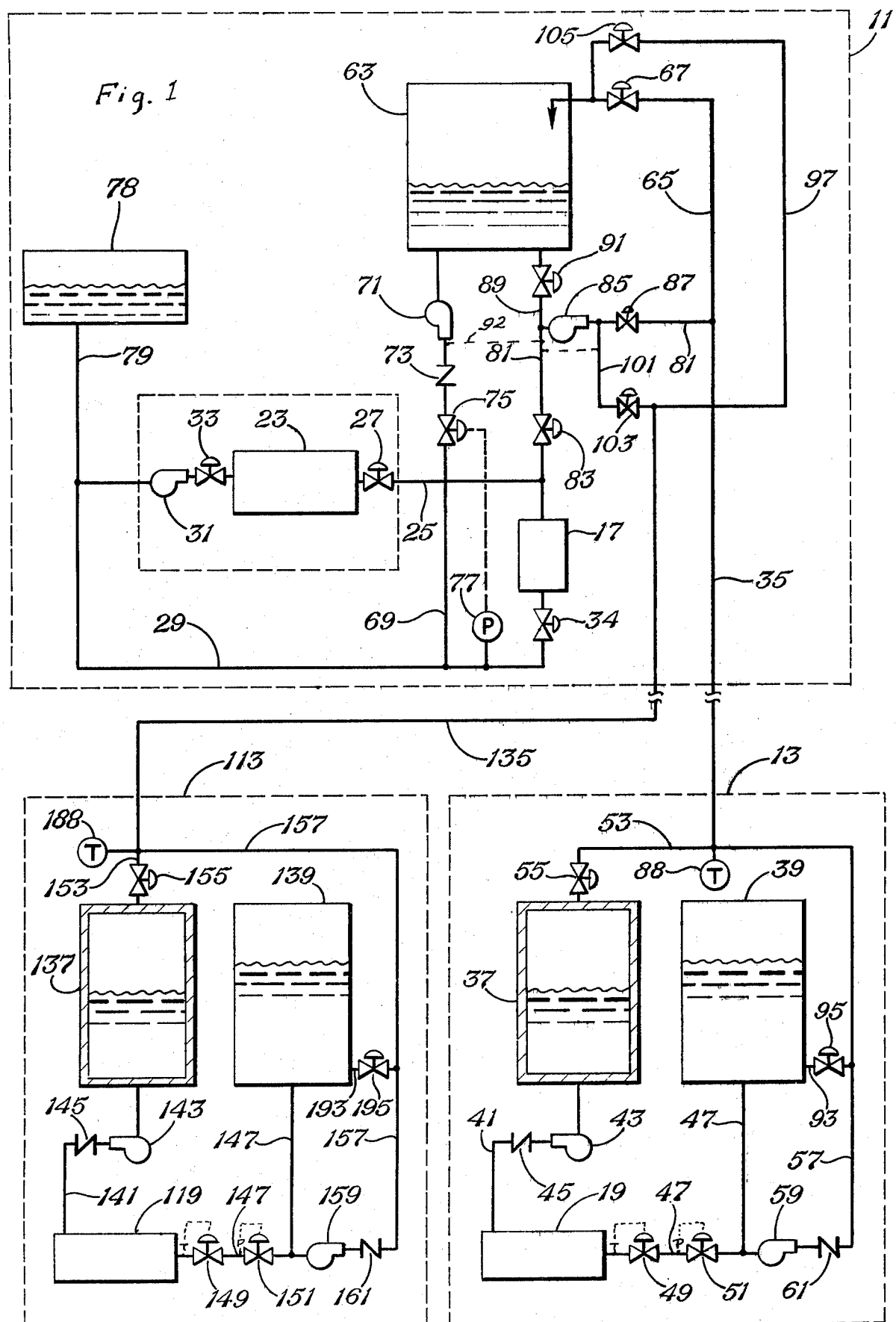
FIG. 1 is a schematic illustration of the present invention.

Referring to the FIG. 1, the invention is shown in schematic view. The view shows an air conditioning system which provides air conditioning at three locations. These locations, 11, 13 and 113 each have air conditioning loads 17, 19 and 119 respectively. The loads may be, for example, conditioning air circulated in a building. A conditioned fluid such as chilled or heated water is circulated for heat exchange through the loads producing air conditioning with the exchange of heat. The conditioned fluid is heated or cooled in preparation for this heat exchange in a central conditioning unit 23 located at location 11. The locations 11, 13 and 113 are remotely located from each other and, therefore, the conditioned fluid which is prepared at location 11 must be piped over long distances to reach locations 13 and 113. After exchanging heat at the loads, the fluid must be returned to the main conditioning unit 23 for reconditioning; the fluid from locations 13 and 113 again being piped over long distances to location 11. This invention allows the long distance circulation of the conditioned fluid to be achieved in a manner which has many advantages.

Connecting the loads 17, 19 and 119 to the central conditioning unit 23 are a variety of tanks and conduits. The fluid leaving the central conditioning unit 23 enters a conduit 25 having a valve 27 for regulating the flow of fluid leaving the central conditioning unit 23. Fluid entering the central conditioning unit 23 travels through a conduit 29 which has a pump 31 and a valve 33 for motivating and regulating the flow of fluid into the central conditioning unit 23. The load 17, which is located at the same location 11 as the central conditioning unit 23, is connected across the conduits 25 and 29. The input to load 17 is connected to conduit 25 and the output of load 17 is connected to conduit 29. On the output of load 17 is a valve 34 for regulating the fluid flow across load 17 and, therefore, the amount of heat exchange. As described above, fluid which leaves the central conditioning unit passes through conduit 25, enters load 17, exchanges heat, and is returned to the central conditioning unit 23 by way of conduit 29. This is the usual method of connecting a load to the conditioning unit. With the loads 19 and 119, however, a different type of connection is used and it is this connection which is the heart of this invention.

Since the connections to loads 19 and 119 are of the same type, those to load 19 will be described first in separate detail. Extending from location 11 to location 13 is a single conduit 35. This single conduit 35 carries the conditioned fluid which supplies conditioned fluid to the load 19 and the unconditioned, or heat exchanged, fluid that is being returned to the central conditioning unit 23. These transmissions of fluid through conduit 35 are, of course, non-simultaneous since fluid can not pass in two directions through a single conduit. At location 13 are two tanks 37 and 39 for holding fluid. Tank 37 holds conditioned fluid which is still chilled or heated in preparation for transfering energy to the load 19. Tank 39 holds fluid that has already passed through the load 19 and is ready to be returned to the central conditioning unit 23. Together these two tanks allow the operation of passing fluid through the load 19 to be independent of what is currently passing through conduit 35. In other words, except for long term supply and return of fluid through conduit 35, fluid flow through load 19 is not dependent on the central conditioning unit 23.

Tank 37 is connected to the load 19 by a conduit 41 having a pump 43 and a check valve 45. Tank 39 is connected to the load 19 by a conduit 47 having two valves 49 and 51 for regulating flow therethrough. The pump 43 pumps conditioned fluid from tank 37 to the load 19 where heat exchange occurs. As the fluid leaves the load 19 it passes through conduit 47 and into tank 39. Valve 49 can be used to regulate the volume flow of the fluid through load 19 such that the proper amount of heat transfer occurs at the load. For example, the proper volume can be determined based on temperature of either the effluent heat exchange fluid (shown by T) or the effluent air from heat exchanger 19. Valve 51 is a back pressure control valve and it functions to maintain a positive fluid pressure (shown by P) at load 19 when it is located at a higher elevation than tank 37. As long as tank 37 contains conditioned fluid and tank 39 has room to hold return fluid, air conditioning at load 19 as described above can occur. To maintain this situation tank 37 is connected to conduit 35 by a conduit 53 having a valve 55. Conditioned fluid, when supplied from location 11 through conduit 35 to location 13, can thus enter tank 37 when valve 55 is open. Tank 39 is connected to conduit 35 by way of conduit 47, the input to tank 39 from load 19. Downstream of valves 49 and 51 conduit 47 is joined to a conduit 57 having a pump 59 and check valve 61. The other end of conduit 57 is connected to conduit 35. When fluid is to be returned from tank 39 to location 11 pump 59 is activated and fluid from load 19 and tank 39 passes through conduit 47 and then conduit 57 to conduit 35 and on to location 11. Of course, valve 55 would be closed during the process of returning fluid from tank 39 in order to prevent return fluid from entering tank 37.

Referring again to location 11, conduit 35 is connected to a return fluid storage tank 63 by a conduit 65. A valve 67 on conduit 65 regulates flow through conduit 65. When fluid is returned from location 13 by way of conduit 35 it passes through conduit 65 into tank 63. To complete the return of fluid to the conditioning unit 23 tank 63 is connected to conduit 29 by a conduit 69 having a pump 71, a check valve 73, and a pressure control valve 75. When fluid is to be returned from tank 63 to the conditioning unit 23 pump 71 is activated and the flow through conduit 69 is pressure controlled by valve 75 which is connected to a pressure sensor 77 on conduit 29. In this manner fluid from tank 63 passes through conduit 69 to conduit 29 and then into the conditioning unit 23. Pressure sensor 77 controls valve 75 to maintain a pressure at its location equal to the pressure setting of expansion tank 78.

In order to supply conditioned fluid to conduit 35 for transmission from location 11 to location 13, a conduit 81 connects conduit 25 to conduit 35. This conduit 81 has a valve 83, a pump 85 and a valve 87 to control the flow of fluid therethrough. When it is desired to supply conditioned fluid to location 13 valve 83 is opened and pump 85 is activated. When this occurs conditioned fluid from conditioning unit 23 passes through conduit 25, then through conduit 81 into conduit 35 and on to location 13. Pump 85 is not a necessary element of this system if the pressure maintained in conduit 25 is adequate to transfer the fluid through conduit 35 to location 13. In the later case conditioned fluid will be transfered to location 13 anytime valve 83 and 87 are opened.

From the above description it can be seen how conditioned fluid passes from the conditioning unit 23, through conduit 35, to load 19; and how return fluid passes from load 19, through conduit 35, back to the conditioning unit 23. During this preocess conduit 35 is alternately filled with conditioned fluid and then with return fluid. When changing from transmitting conditioned to return fluid or vice versa it is desirable not to waste conditioned fluid by dumping it into return fluid or to spoil the conditioned fluid by dumping return fluid into it. These undesirable conditions would occur if pumps 85 and 59 were run alternately while simply opening and closing the above described valves. For example, if conditioned fluid had just been pumped to location 13 and filled conduit 35, and pump 59 is activated to transmit return fluid to location 11, then the conditioned fluid filling conduit 35 will be dumped into tank 63 and wasted. Since conduit 35 may be a very long conduit this waste can be considerable. To avoid this kind of loss two conduits with valves and a temperature sensor are provided. A fluid temperature sensor is located at the junction of conduit 35 and conduits 53 and 57. A conduit 89 with a valve 91 connects tank 63 to conduit 81 between valve 83 and pump 85. When pump 85 is not an element of this system conduit 89 is connected to the discharge of pump 71 and valve 91 is located between this connection and conduit 81, as shown in dashed lines 92, FIG. 1. A conduit 93 with a valve 95 joins tank 39 with conduit 57 between check valve 61 and conduit 35. These valves and conduits allow return fluid to fill conduit 35 either ahead of or behind the pumped conditioned fluid to prevent the above waste. The fluid temperature sensor allows the valves to open or close at the proper time in order to precisely avoid waste. The above described fluid flow will be described below in more detail.

The operation of pumping conditioned fluid to and from location 13 will not be described in detail. It is assumed as a starting condition that fluid has just been returned from tank 39 at location 13 to tank 63 at location 11, and that valves 55, 95, 67, 83, and 91 are closed, and that pumps 59 and 85 are inactive. It is further assumed that there is now a need for additional conditioned fluid in tank 37. To fulfill this need valves 83, 87, and 95 are opened and pump 85, if utilized, is activated. This causes conditioned fluid from the conditioning unit 23 which is passing through conduit 25 to enter conduit 81 and then conduit 35. Anytime conditioned fluid is removed through valve 83, an equal amount of return fluid must be passed through pump 71, check valve 73 and valve 75 to replenish the water being taken from the central system. Meanwhile, since valve 95 is open and valve 55 is closed, conduit 35 is purged of the return fluid which occupies it by passing it back into tank 39. This purging of return fluid can be precisely controlled since the fluid temperature sensor 88 registers the temperature of the fluid passing the junction of conduit 35 and conduits 53 and 57. When the sensor 88 detects a temperature indicating that conditioned fluid has reached the sensor then valve 95 is closed and valve 55 is opened. This causes the conditioned fluid to enter conduit 53 rather than conduit 57. Conditioned fluid then flows into tank 37 until tank 37 is nearly full. When tank 37 is filled to the point where only an amount equal to the capacity of conduit 35 remains unfilled then valve 83 is closed as valve 91 is opened and pump 71 is energized if pump 85 is not utilized. This allows the conditioned fluid to be purged from conduit 35 by return fluid in preparation for the return fluid cycle. When temperature sensor 88 detects the presence of return fluid at the junction of conduit 35 and conduits 53 and 57 then pump 85 or 71 is deactivated and valves 91 and 55 are closed. When tank 39 is filled to the point where there is a need to return fluid to location 11 then valve 67 is opened and pump 59 is activated. Since the previous transmission of conditioned fluid left conduit 35 filled with return fluid no special changing of valves is needed in the return process. When tank 39 is empty pump 59 is deactivated and valve 67 is closed.

Preferably, or course, the respective valves and pumps described above are operated automatically. The individual components and connections providing automatic operation are not shown since automatic operation is not a necessary part of this invention and such components are old in the art. As an example of how automatic operation would be performed, the automatic operation of tank 37 will be described. The additional components to be described are not shown in the Fig. since they tend to clutter the Fig. and confuse the operation of the invention. Near the bottom of tank 37 is a first liquid level sensor which is connected for automatic operation to pump 43. This first sensor causes pump 43 to cease pumping when tank 37 is empty. Also near the bottom of tank 37 is a second liquid level sensor connected for automatic operation to pump 85 and valves 83, 87 and 95. When this second sensor detects that tank 37 requires additional conditioned fluid, pump 85 is activated and valves 83, 87 and 95 are opened. Sensor 88 (previously described) is connected for automatic operation to valves 95 and 55. When conditioned fluid reaches sensor 88 valve 95 is closed as valve 55 is opened. A third liquid level sensor near the top of tank 37 is connected for automatic operation to valves 83 and 91. When this third sensor indicates that the capacity remaining in the tank while filling is equal to the capacity of conduit 35, valve 83 is closed while valve 91 is opened. Sensor 88 is additionally connected for automatic operation to valve 55, valve 91, and pump 85. When sensor 88 detects that the last of the conditioned fluid has passed then valves 91 and 55 are closed and pump 85 is deactivated. The above liquid level sensors and controllers and temperature sensors and controllers are conventional and can be installed in accordance with conventional technology. Suitable liquid level sensors in tanks 39 and 63 can also be provided to allow the preferable automatic operation of the pumps and valves used in connection with these tanks.

The components at location 113 correspond to the components at location 13 and are, therefore, numbered correspondingly such that the components at location 113 are one hundred higher than those at location 13. For example, tank 37 at location 13 corresponds to tank 137 at location 113. The components at this additional location are shown in order to reveal how the additional remote load can be operated with a single pump 85 and a single tank 63. Connected to conduit 81 between the outlet of pump 85 and valve 87 is a conduit 101 having a valve 103. The other end of conduit 101 is connected to conduit 135. At location 11 conduit 135 is connected to a conduit 97 which in turn is connected to conduit 35 between tank 63 and valve 67. A valve 105 is located on conduit 97 near the connection to conduit 35. These additional connections allow pump 85 and tank 63 to serve both locations 13 and 113. If it is found necessary to pump fluid from location 113 while pumping to location 13 or vice versa, the valves 87 and 103, and any additional ones in parallel, allow controlling flow to any one or more of the satellite facilities, while blocking flow to others as desired. These extra valves also, would allow prevention of contamination of return fluid with conditioned fluid during this two way exchange.

While tanks 37 and 39 were described as separate containers, it is possible to use a single tank with a thermal separation of the conditioned and return fluids. If, for instance, a chilled liquid were used as the conditioned fluid then the connections which were to tank 37 would be located at the bottom of the single tank while the connections which were to tank 39 would be located at the top of the single tank. Otherwise there are no new connections necessary to operate with a single tank having thermal separation.

Figure 2:
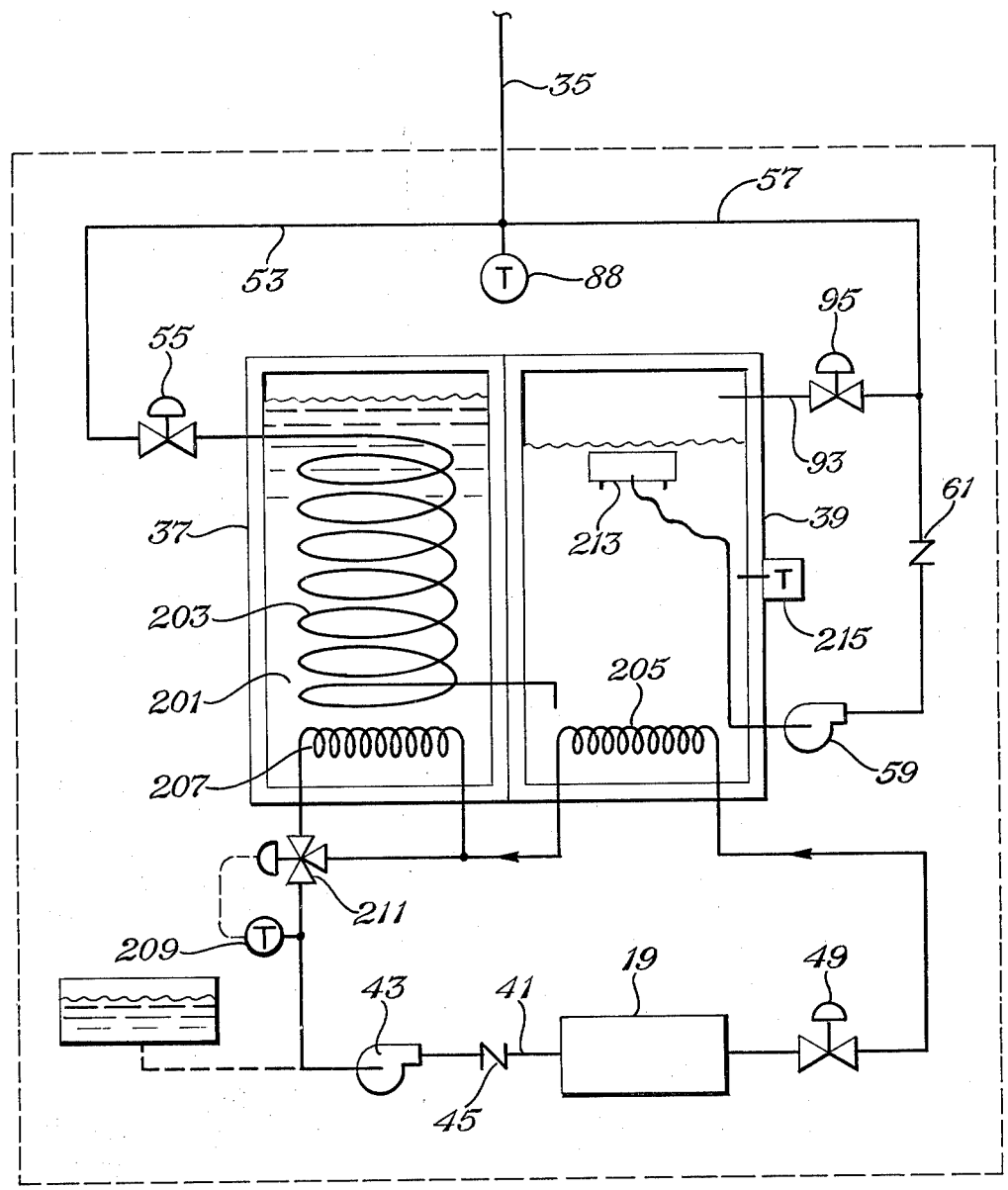
FIG. 2 is a schematic illustration of another embodiment of this invention, showing a satellite employing phase change thermal storage.

FIG. 2 shows schematically a satellite facilities enabling employing a phase change to augment the heat exchange capability at the satellite. The interconnections and capabilities are substantially the same as described with respect to FIG. 1 except a phase change material 201 in tank may change phase. To effect the phase change, the cooled (or heated as the case may be) fluid is passed through coil 203. For example, if the material 201 is water to be converted, at least in part, to ice, the cold brine is flowed through the coil 203 into tank 39. Any of the usual materials employed in thermal storage can be employed in tank 37. For example, in addition to water, to go to steam or ice, the material may comprise eutectic salts that melt at the desired temperature (for example, 150° F., 60° C.), or material may comprise one of the halogenated hydrocarbons, such as the Freons like Freon 12, Freon 22 at a desired pressure and temperature. The material may be converted from a solid to a liduid or from a liquid into a gas to store heat or from a liquid (or gas) into a solid to store cooling (or heat removal) capability. The energy transfer fluid that is circulated in heat exchange with the load 19 is flowed first through the heat exchanger coil 205 and only through second heat exchanger coil 207, if needed. A thermostat 209 is driving connected with a three-way valve 211 to effect the desired flow, up to and included full series flow, through the coils 205 and 207.

The operation of the embodiment of FIG. 2 is made clear by the following descriptive matter.

Starting Condition

Tank 39 is empty of conditioned fluid at a temperature level that no longer can provide any energy to load 19. Phase change material 201 is at the phase of lowest energy storage capacity. Load 19 is being served by energy from phase change material 201. through heat exchanger 207. It is worth repeating at this point that "adding energy" is employed in the sense of taking the energy transfer fluid in the direction desired, be it heating or cooling.

Recharge Cycle

Valve 55 is opened allowing conditioned fluid to exchange heat with phase change material 201 while passing through heat exchange coil 203 in route to tank 39. This process continues until tank 39 is filled and conduit 35 is filled with conditioning fluid that needs to be recharged. During the filling process phase change material 201 changes phase providing substantial energy storage, or cooing capability storage if, for example, cold brine freezes the water 201 to ice.

Pump 43 circulates energy transfer fluid through load 19 at a utilization rate controlled by valve 49. Energy is first added to the energy transfer fluid at heat exchanger 205 removing all available energy first from storage tank 39. If heat exchange coil 205 does not provide enough heat transfer, valve 211 mixes the flows from heat exchanger coils 205 and 207. Valve 51 would not be necessary in this system because it is a closed system with operating pressures being controlled by the setting of the expansion tank.

Return of Conditioned Fluid

When all usable energy is removed from tank 39, for example, as signalled by temperature-responsive controller; pump 59 is energized and the fluid is pumped through conduit 35 to location 11. Valves 55 and 95 are closed during this operation. Floating suction 213 ensures that the lowest energy level fluid is returned first. (Cooling operation only).

Purge Cycle

When conditioned fluid is again required but conduit 35 is full of fluid to be recharged, conditioned fluid is allowed to enter conduit 35 by valve 83 at location 11, FIG. 1. Simultaneously valve 95 is opened. When conditioned fluid reaches temperature sensor 88 valve 95 is closed and valve 55 is opened starting the recharge cycle.

The above described invention has several advantages over the prior art. Since a single conduit is less expensive than a dual conduit with the same flow capacity, the single conduit, such as conduit 35, increases the distance for economical transmission of fluid from a central plant for air conditioning. This invention also allows the single conduit to be sized for an average load since the storage of fluid at tank 37 and 39 can extend beyond a short term peak period. This reduces the maximum load size of the conditioning unit, and therefore, increases its efficiency. In addition, since conditioned fluid is not maintained in the long, remote conduit 35 except for short periods, losses due to conduction and radiation from the conduit are reduced. This also increases the air conditioning efficiency and reduces the insulation costs for the piping.

Of course, the storage tanks for the conditioned fluid are insulated (as shown in the Figs.) to minimize undesired heat transfer.

If desired, a conditioned fluid surge tank can be employed at the central facility 11 to maintain a more nearly uniform demand on the conditioning unit 23.

The foregoing disclosure and the showings made in the drawings are merely illustrative of the principles of this invention and are not to be intepreted in a limiting sense.

What is claimed is:

1. In an air conditioning system which utilizes a fluid for transferring energy for air conditioning from a first location to a second location; said system being of the type wherein said fluid is conditioned by a conditioning device at said first location, said fluid is transferred to said second location for exchanging heat with a load, and said fluid is returned from said second location to said conditioning device at said first location for reconditioning; the improvement which comprises:
    a. a first storage means for storing said fluid prior to said fluid exchanging heat with said load; said first storage means being disposed at said second location and connected for transmitting fluid to said load;
    b. a second storage means for storing said fluid after said fluid has exchanged heat with said load; said second storage means being disposed at said second location and connected for receiving fluid from said load;
    c. a third storage means for storing said fluid after it has been returned to said first location prior to being returned to said conditioning device for reconditioning; said third storage means being disposed at said first location and connected for transmitting fluid to said conditioning device;
    d. connecting means for joining in a fluid flow relation said conditioning device and said first storage means, and for joining in a fluid flow relation said second storage means and said third storage means; said connecting means comprising a single conduit from said first location to said second location;
    e. a first pumping means disposed in a fluid pumping relation to said connecting means for pumping said fluid from said conditioning device through said connecting means to said first storage means; and
    f. a second pumping means disposed in a fluid pumping relation to said connecting means for pumping said fluid from said second storage means through said connecting means to said third storage means.

2. The improvement of claim 1 which further comprises:
   a. a first purging means which joins in a fluid flow relation said connecting means and said second storage means for purging said fluid from said single conduit into said second storage means while said fluid fills, from said conditioning device, said single conduit; and
   b. a second purging means which joins in a fluid flow relation said third storage means and said connecting means for purging said fluid from said single conduit with said fluid from said third storage means until said fluid from said third storage means fills said single conduit.

3. The improvement of claim 2 wherein there are a plurality of said second locations, said first storage means, said second storage means, said connecting means, said second pumping means, and said first purging means connected respectively in discrete locations and operating entities.

4. The improvement of claim 2 wherein said first purging means comprises:
   a. a first purging conduit which connects in fluid flow relation said connecting means to said second storage means; and
   b. a first purging valve disposed in a fluid flow regulating relation to said first purging conduit; and wherein said second purging means comprises;
   c. a second purging conduit which connects in fluid flow relation said third storage means to said connecting means on the intake side of said first pumping means; and
   d. a second purging valve disposed in a fluid flow regulating relation to said second purging conduit.

5. The improvement of claim 4 which further comprises a fluid temperature sensor disposed for detecting the fluid temperature in said single conduit as said fluid enters or leaves said second location; said sensor allowing said first and second purging means to more accurately purge fluid from said single conduit to prevent energy waste.

6. The air conditioning system of claim 1 wherein said first and second storage means includes a first vessel containing material capable of changing phase in response to heat exchange with a conditioned fluid.

7. The air conditioning system of claim 6 wherein said first and second storage means includes a first vessel containing the phase change material, a heat exchange coil disposed in said first vessel and in heat exchange relationship with said phase change material; said coil being connected at its inlet end with said single conduit of said connecting means and terminating at its open end in a second vessel; said first and second storage means including a second vessel having the end of said coil terminating there within so as to flow thereinto a conditioned fluid; wherein said first storage means is connected for transmitting fluid to said load by virtue of having a heat exchange coil disposed in heat exchange relationship with said conditioned fluid in said second vessel and connected in series with said load so as to circulate an energy transfer fluid through said load; and wherein a second head exchange coil is disposed in said first vessel in heat exchange relationship with the phase change material and adapted to how said energy transfer fluid flowed therethrough to augment the heat exchange capability of said first heat exchange coil in said second vessel as desired.

8. The air conditioning system of claim 7 wherein said discharge end of said first heat exchange coil in said second vessel is connected in parallel with a three way valve and with said second heat exchange coil in said first vessel; the discharge end of said second coil in said first vessel is also connected with said three way valve; a temperature responsive means is drivingly connected with said three way valve so as to effect the desired admixture of affluent fluids from said first and second coils up to and including full series flow through both said coils to effect a predetermined temperature of fluid being circulated through said load.

9. The air conditioning system of claim 8 wherein said second vessel forms a thermocline in which heated fluid rises to the top and in which a suction for a second pumping means is disposed in the portion of the fluid to be reconditioned.

* * * * *